Oct. 17, 1961     K. A. MERZ     3,004,326
SUPPORT STRUCTURE AND METHOD FOR MAKING A BLOWER WHEEL
Filed Nov. 21, 1955     2 Sheets-Sheet 2

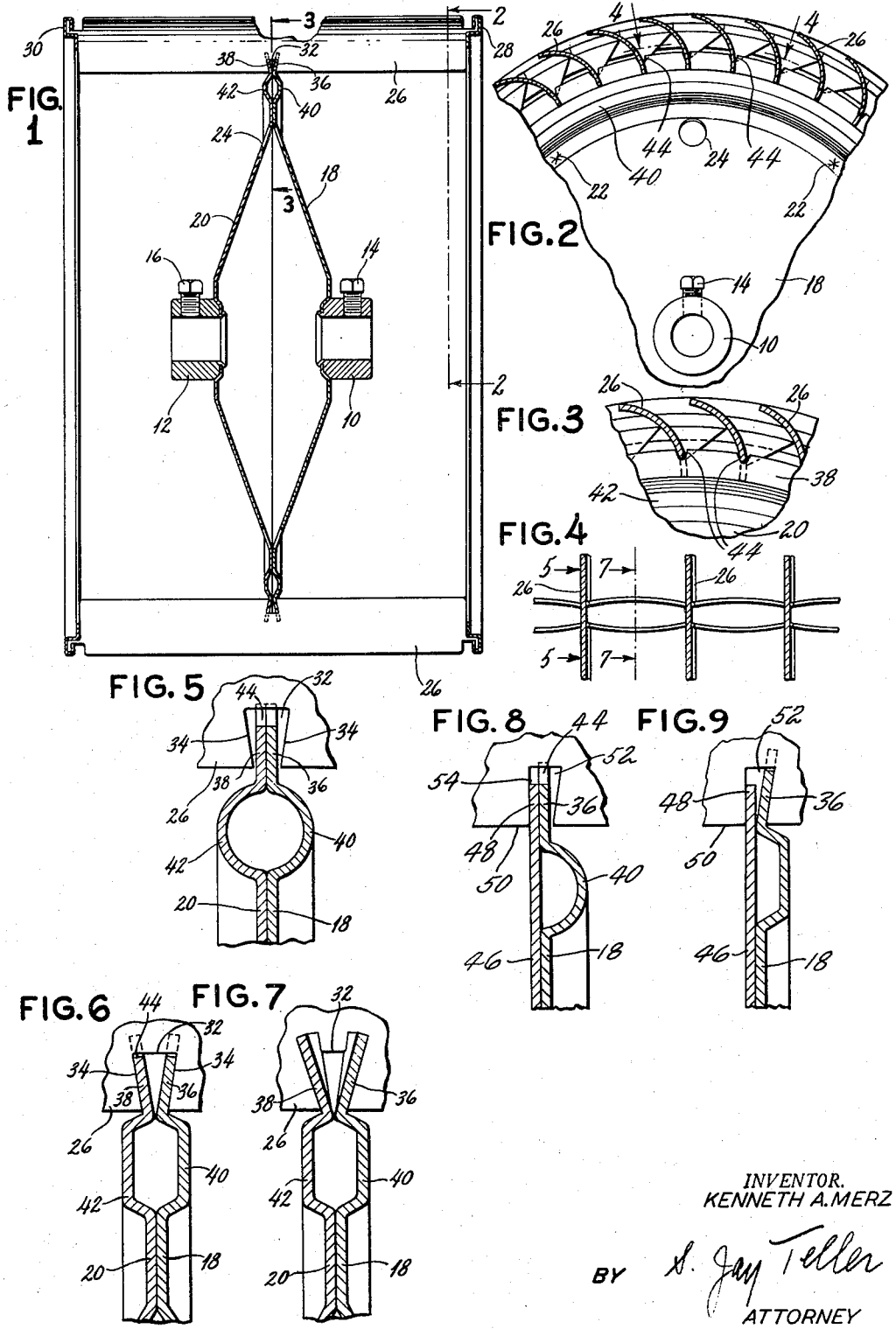

*INVENTOR*
*KENNETH A. MERZ*

BY *S. Jay Teller*
*ATTORNEY*

United States Patent Office 3,004,326
Patented Oct. 17, 1961

3,004,326
SUPPORT STRUCTURE AND METHOD FOR MAKING A BLOWER WHEEL
Kenneth A. Merz, Cornwall, Conn., assignor to The Torrington Manufacturing Company, Torrington, Conn., a corporation of Connecticut
Filed Nov. 21, 1955, Ser. No. 548,166
17 Claims. (Cl. 29—156.8)

This application is a continuation-in-part of my prior application Serial No. 441,612 filed July 6, 1954, for Support Structure and Method for Making a Blower Wheel, now abandoned.

The invention relates to a blower wheel of the type wherein there is an annular series of longitudinal air moving blades and wherein there is a generally radial structure engaging the blades between the ends thereof to connect them with a central hub or hub means.

One object of the invention is to provide a simple, dependable and inexpensive method for providing a connection between the radial structure and the blades which connection serves to hold the blades in fixed relationship with the said radial structure. Another object of the invention is to provide an initial central support structure adapted for use in the practice of the method.

In the drawings I have shown in detail alternative illustrations of the method of making a blower wheel and alternative illustrations of the central support structure, but it will be understood that various changes may be made from the constructions and the methods shown, and that the drawings are not to be construed as defining or limiting the scope of the invention, the claims forming a part of this specification being relied upon for that purpose.

Of the drawings:

FIG. 1 is a vertical longitudinal sectional view of a blower wheel made in accordance with the method of the invention.

FIG. 2 is a fragmentary transverse sectional view taken along the line 2—2 of FIG. 1.

FIG. 3 is an enlarged fragmentary transverse sectional view taken along the line 3—3 of FIG. 1.

FIG. 4 is an enlarged fragmentary sectional view taken along the line 4—4 of FIG. 2.

FIG. 5 is an enlarged fragmentary sectional view taken along the line 5—5 of FIG. 4 but showing the parts in an intermediate stage in the method of making the blower wheel, this view showing the initial support structure of the invention.

FIG. 6 is a view similar to FIG. 5 but showing the parts in final positions.

FIG. 7 is an enlarged fragmentary sectional view taken along the line 7—7 of FIG. 4.

FIG. 8 is a view similar to FIG. 5 but showing alternative structural features.

FIG. 9 is a view similar to FIG. 6 but showing the same alternative features as shown in FIG. 8.

Figure 10:
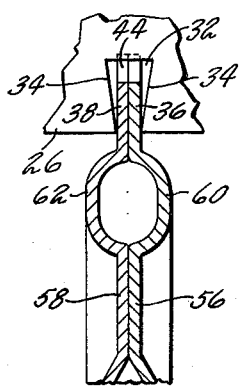
FIG. 10 is an enlarged fragmentary sectional view similar to FIG. 5 but showing an alternative illustration of the method.

Referring to the drawings and more particularly to FIGS. 1 to 7 thereof, the blower wheel as illustrated includes a hub means which is shown as comprising two separate similar hubs 10 and 12. When the hub means comprises two hubs such as 10 and 12, the two hubs are in longitudinal register with each other and are rotatable about the same longitudinal axis. They are adapted for mounting on a rotatable shaft and as shown set screws 14 and 16 are provided for connecting the hubs with the shaft. At least one generally radial supporting member or disc 18 is provided, this disc having its inner portion rigidly connected with the hub means. A second supporting member or disc 20 is also provided and this is preferably similar to the disc 18. When there are two similar discs they are rigidly connected respectively with the two hubs 10 and 12. The discs 18 and 20 are connected with each other near their peripheries as for instance by spot welding, as indicated at 22, 22. The discs 18 and 20 are preferably partly conical in shape so that the hubs 10 and 12 are spaced apart longitudinally and so that the portions of the discs adjacent the hubs converge toward their connected peripheral portions. One or more drain holes such as 24 may be provided in at least one of the discs to permit the escape of water which might otherwise accumulate in the space between the discs. The discs 18 and 20 are shown as being identical in construction but in relatively reversed positions.

The blower wheel includes an annular series of equally spaced longitudinal air moving blades 26, 26, the said series being concentric with the axis and the blades of the said series being adjacent the periphery of the disc or discs. The blades 26, 26 may have any usual or preferred cross-sectional shape and the shape of the blade does not constitute any part of the present invention. The blades are shown as being structurally separate from each other, but the invention is not necessarily so limited.

Means are provided at the ends of the blades for connecting them with each other, these means being shown as being two similar end rings 28 and 30. The details of connection between the blades and the end rings may be in accordance with conventional practice and do not constitute any part of the present invention. The blades 26, 26 are formed respectively with notches 32 near their centers, the several notches being arranged in an annular series. Each notch extends outwardly from the inner edge of the corresponding blade and has opposite lateral edges 34, 34 which preferably diverge outwardly. As shown, the edges 34, 34 of each notch 32 are straight and are equally inclined in opposite directions, but as to these details there may be substantial variation.

The disc 18 has a peripheral portion 36 which is entered in the notches 32 of the several blades. The supporting member additional to the disc 18 has a portion 38 that is also entered in the said notches 32. When the additional means or member is a second disc such as 20, the said portion 38 is a peripheral portion similar to the peripheral portion 36 of the disc 18. In the blower wheel as shown in FIG. 1, the peripheral portions 36 and 38 of the supporting members or discs are spaced apart and they diverge outwardly. Said peripheral portions are respectively in engagement under pressure with the diverging opposite edges of said notches 32 in the blades 26.

In accordance with the method of the invention, the peripheral portions 36 and 38 of the supporting members are shown in FIG. 5 as being initially flat and in contact with each other, but the invention is not necessarily so limited as it is only necessary for said peripheral portions to be at least approximately in contact with each other and so related that they can enter the blade notches 32. Further in accordance with the method, pressure is applied to said two supporting discs 18 and 20 to cause said peripheral portions 36 and 38 thereof to swing away from each other and outwardly diverge so that said peripheral portions 36 and 38 have pressure engagement with the outwardly diverging edges of the blade notches 32 so as to firmly hold the blades 26 in fixed relationship to said discs 18 and 20. As shown in FIG. 5, at least one of the supporting members or discs 18 and 20 is initially formed with an annular bead such as 40, this bead being adjacent and spaced inwardly from the corresponding peripheral portion 36. The bead 40 on one disc projects away from the other disc. Preferably and as shown, the two members or discs 18 and 20 have similar oppositely projecting annular beads 40 and 42 adjacent and spaced inwardly from the peripheral portions 36 and 38. The members or discs 18 and 20 have inner annular portions at least approximately in contact with each other and located adjacent the inner edges of the beads.

In making the blower wheel the discs 18 and 20 are connected with the hubs 10 and 12 and the discs are connected with each other, as previously described. The said discs with their annular beads and the said hub means collectively constitute an initial central support structure for the blower wheel.

The blades 26, 26 are assembled with the support structure, the blades being assembled so that the peripheral portions 36 and 38 are entered in the notches 32 as shown in FIG. 5. The outer edges of the beads 40 and 42 are closely adjacent the inner edges of the blades 26, but are nevertheless spaced inwardly therefrom to a small extent. The assembled parts are preferably held temporarily in a suitable fixture so that the annular series of blades is concentric with the axis of the hubs. Thereafter the end rings 28 and 30 are put in place so as to connect the blades with each other and thus hold them in their proper spaced relationship.

After preliminary assembly as described, the bead 40 or both beads 40 and 42 are subjected to longitudinal pressure throughout their entire lengths. The beads are at least partly flattened, being changed from the shapes shown in FIG. 5 to the shapes shown in FIG. 6. The partial flattening of each bead resultantly causes the corresponding peripheral portion to swing away from the other peripheral portion and, when there are two beads such as 40 and 42 and two peripheral portions such as 36 and 38, said peripheral portions swing away from each other. At the same time the diameters of the discs are slightly increased so that the outer edges of the beads 40 and 42 move closer to the inner edges of the blades 26 as shown in FIG. 6. The described swinging movements of one or both of the peripheral portions 36 and 38 cause them to outwardly diverge and to engage the edges 34, 34 of the several blade notches as shown in FIG. 6, the blades and the discs being thus firmly connected with each other. When the notch edges outwardly diverge, as is preferred, the outwardly diverging disc portions engage and fit said notch edges throughout major parts of the lengths thereof. The two discs together with the hub means therefor constitute an initial central support structure for use in making a centrifugal blower wheel that includes an annular series of similar longitudinal air moving blades having notches as described. Said flat peripheral portions of the discs are adapted for entry in the notches in the blades of an annular series such as has been described. Said outer peripheral portions of said discs and said beads thereof are so related to each other that pressure applied longitudinally to at least partially flatten said beads causes said peripheral portions to swing away from each other and into engagement with the opposite diverging edges of the notches in the blades of an annular series such as aforesaid. In the described support structure, each disc is circular and has an exposed peripheral edge. There are inner annular flat portions which are in face-to-face engagement with each other and are surrounded by the beads 40, 40 and there are outer annular flat portions which are in face-to-face engagement with each other and are in the same planes as the inner flat annular portions. The said outer annular flat portions surround the beads 40, 40 and they extend outwardly from the beads to said exposed peripheral edges. The beads 40, 40 are located with their outer edges at a radial distance from the support structure axis which is slightly less than the radial distance of the inner edges of the blades from their central axis. The depth of the notches 32 must be much less than the width of the blades 26, 26 between the inner and outer edges thereof, and the depth is shown as being less than half of the width of the blades. The width of said flat peripheral portions of the discs is therefore less than one-half of the width of the blades.

Where the peripheral portions of the members or discs engage the blades 32, 32 as shown in FIG. 6, their swinging movements are limited by their engagement with the blade notch edges 34, 34 and said peripheral portions therefore have engagement under pressure with said diverging edges. However, between the blades the swinging movements are not so limited and the peripheral portions swing away from each other to greater extents as shown in FIG. 7. The outer edges of the peripheral portions undulate as shown in FIG. 4. It will be seen that the said peripheral portions 36 and 38 have a divergence between the blades which is greater than the divergence at the blades. Thus the peripheral portions of the members or discs also serve to positively hold the blades in proper spaced relationship.

Preferably at least one of the members or discs 18 and 20 is provided with peripheral notches 44, 44 spaced in accordance with the spacing of the blades 26, 26. The notches 44, 44 are shaped to accommodate the curvature of the blades, as shown in FIG. 3. As shown both discs 18 and 20 are provided with notches 44, 44, the notches in the two discs being in register with each other. During initial assembly, the blade portions adjacent the outer edges of the blade notches 32 are entered in the disc notches as shown in FIGS. 3 and 5. When the discs are deformed from the FIG. 5 shape to the FIG. 6 shape, the said portions of the blades remain at least partly entered in the disc notches as shown in FIG. 6. Thus the notches in the discs cooperate with the undulating peripheral shapes of the discs to positively hold the blades in proper spaced relationship.

FIGS. 8 and 9 are similar respectively to FIGS. 5 and 6 but they illustrate the fact that one of the two discs or supporting members may be flat and without any bead such as 40 or 42.

As shown in FIG. 8, a disc 18 is provided which is or may be exactly the same as the disc 18 shown in FIG. 5. In lieu of the beaded disc 20 there is provided a flat disc 46 which need not be directly connected with the hub means, but which is shown as having a large central opening and as being connected by welding or otherwise to the disc 18, the connection being near the edge of said opening. The disc 46 is entirely flat and the diameter of its peripheral portion 48 is the same as the diameter of the disc 18 at the bottoms of the notches 44.

Alternative blades 50 are provided having notches 52 which are similar to the notches 32 except that the edge 54 at the left is perpendicular instead of inclined.

After preliminary assembly as previously described, the bead 40 of the disc 18 is subjected to longitudinal pressure and the bead is at least partly flattened as shown in FIG. 9. The partial flattening of said bead resultantly causes the peripheral portion 36 of the disc 18 to swing away from the peripheral portion 48 of the disc 46. At the same time the diameter of the disc 18 is slightly increased. The described swinging movement of the portion 36 of the disc 18 away from the peripheral portion 48 of the disc 46 causes said peripheral portions to outwardly diverge and to engage the outwardly diverging edges of the blade notches 52 as shown in FIG. 9, the blades and the discs being thus firmly connected with each other. The peripheral portions of the discs are in engagement under pressure with the edges of the blade notches 52, 52.

Figure 11:
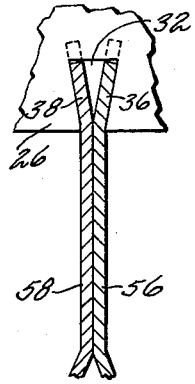
FIG. 11 is a view similar to FIG. 10 but showing the parts in final positions, all parts behind the section being omitted.

The construction shown in FIGS. 10 and 11 differs from that shown in FIGS. 1 to 5 in that there are discs 56 and 58 having beads 60 and 62 that are provided in lieu of the beads 40 and 42, the said beads 60 and 62 being somewhat shallower. The depths of the beads 60 and 62 are such that they can be completely flattened as shown in FIG. 11 instead of being only partially flattened as shown in FIG. 6. The swinging movements of the peripheral portions 36 and 38 and the increase in disc diameter are substantially the same as previously described and repetition of the description is unnecessary.

Figure 12:
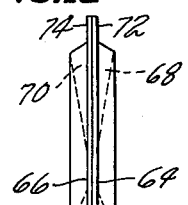
FIG. 12 is a fragmentary side view of an alternative central support structure prior to assembly with the blades.

The partial or complete flattening of beads shaped as shown in FIG. 5 or in FIG. 8 or in FIG. 10 causes considerable increases in the diameters of the discs and it may sometimes be highly desirable to hold such increases to a minimum. For reducing the amount of diameter increase, an alternative initial central support structure may be provided as shown generally in FIG. 12 and in greater detail in FIGS. 13 and 14. This alternative initial support structure as shown comprises discs 64 and 66 and hub means connected with said discs which hub means may be two separate hubs 10 and 12 as shown in FIG. 1. A flat plate, not shown, may be substituted for one disc as illustrated in FIGS. 8 and 9. The discs 64 and 66 are generally similar to the discs 58 and 60 shown in FIGS. 10 and 11 but they have different beads 68 and 70. Said discs 64 and 66 have peripheral portions 72 and 74, but as shown said peripheral portions of the discs do not have any notches such as 44, 44.

The blades 76 for use with the alternative support structure are similar to the blades 26 except that the notches 78 therein have edges 80, 80 with a somewhat greater angle of divergence. As shown, the total angle of divergence is approximately 48°, and each edge has an angle of divergence of approximately 24° from a central radial line.

Each of the beads 68 and 70 on the discs 64 and 66 is unsymmetrical in radial section and has two substantially straight sides or portions 82 and 84 which join at a relatively sharp corner. As shown, the outer side 82 is at a relatively large angle to a radial plane and the inner side is at a relatively small angle to said plane. As shown, said angles are respectively approximately 60° and approximately 10°.

Figure 13:
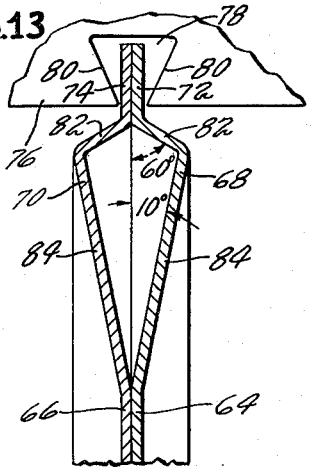
FIG. 13 is an enlarged fragmentary view similar to FIGS. 5 and 10 but showing the alternative support structure shown in FIG. 12.
Figure 14:
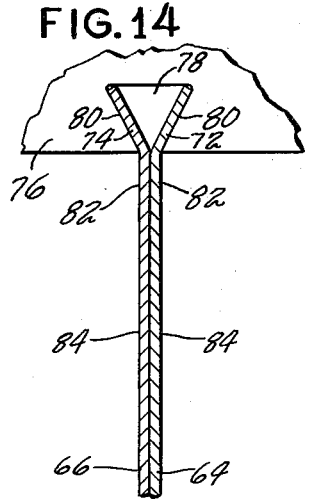
FIG. 14 is a view similar to FIG. 13 but showing the parts in final positions.

The procedure involving the alternative discs 64 and 66 is generally similar to that previously described. In initial assembly the blades 76 can be placed with the inner edges of their notches 78 very close to the peripheries of the discs 64 and 66 as shown in FIG. 13. With the several parts assembled as so shown, the discs 64 and 66 are subjected to longitudinal pressure at the beads 68 and 70 thereof. The discs are preferably completely flattened as shown in FIG. 14, the peripheral portions 72 and 74 thereof being moved to diverging positions and into firm engagement under pressure with the edges 80, 80 of the notches 78. In moving from the FIG. 13 positions to the FIG. 14 positions the peripheral edge of the blade has very little, if any, radially outward movement. Each bead portion 82 moves through an angle of about 60° from the FIG. 13 position to the FIG. 14 position, and this tends to move the corresponding outer portion 72 or 74 of the discs through a similar angle. However, the edge 80 of the blade notch limits outward movement at the blade to about 24°, thus assuring very firm engagement.

Figure 15:
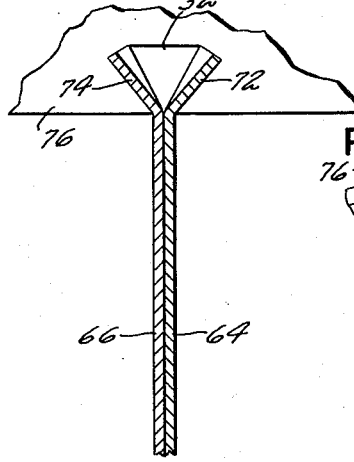
FIG. 15 is a view generally similar to FIG. 7 but showing the alternative construction of FIGS. 12 to 14.

Between the blades each disc portion 72 or 74 moves considerably beyond the 24° limit at the blades so that said disc portions 72 and 74 have a wider angle of divergence at positions between the blades. This is illustrated in FIG. 15 which is in this respect similar to FIG. 7.

Figure 16:
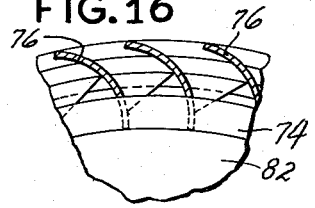
FIG. 16 is a view generally similar to FIG. 3 but showing the alternative construction of FIGS. 12 to 14.

FIG. 16 corresponds to FIG. 3 but shows the alternative construction of FIGS. 12 to 15. It will be particularly observed that the discs have no notches 44, 44 such as shown in FIG. 3.

The blower wheel herein disclosed is not claimed as a part of the present invention, this blower wheel being set forth and claimed in application Serial No. 849,888, filed October 30, 1959, and entitled "Blower Wheel," this last said application being a division of this present application.

The invention claimed is:

1. The herein disclosed method for making a centrifugal blower wheel, which method comprises providing two sheet metal supporting members connected with each other and having adjacent continuous peripheral portions with approximately equal diameters which members are rotatable about a common central longitudinal axis, at least one of the said members being formed with an annular bead adjacent and spaced inwardly from its peripheral portion and projecting away from the other member, providing a plurality of similar air moving blades formed with notches extending outwardly from the inner edges of the blades which notches have outwardly diverging lateral edges, longitudinally positioning said blades in an annular series with their notches forming an annular series and with the peripheral portions of the two supporting members extending into the notches, connecting said blades with each other at the ends thereof, and longitudinally pressing the two supporting members at said annular bead and thus at least partly flattening said bead and resultantly causing the corresponding peripheral portion to swing away from the other peripheral portion so that the two peripheral portions outwardly diverge and have pressure engagement with the outwardly diverging edges of the blade notches so as to firmly hold the blades in fixed relationship to the supporting members.

2. The herein disclosed method for making a centrifugal blower wheel, which method comprises providing two sheet metal supporting discs connected with each other and having adjacent continuous peripheral portions with approximately equal diameters which discs are rotatable about a common central longitudinal axis, each of said discs being formed with an annular bead adjacent and spaced inwardly from its peripheral portion and projecting away from the other disc, providing a plurality of similar air moving blades formed with notches extending outwardly from the inner edges of the blades which notches have outwardly diverging lateral edges, longitudinally positioning said blades in an annular series with their notches forming an annular series and with the peripheral portions of the two supporting discs extending into the notches, connecting said blades with each other at the ends thereof, and longitudinally pressing the two supporting discs at said annular beads and thus at least partly flattening said beads and resultantly causing the corresponding peripheral portions of the discs to swing away from each other and outwardly diverge so that the two peripheral portions have pressure engagement with the outwardly diverging edges of the blade notches so as to firmly hold the blades in fixed relationship to the discs.

3. The herein disclosed method for making a centrifugal blower wheel, which method comprises providing two sheet metal supporting members connected with each other and having adjacent continuous peripheral portions with approximately equal diameters which members are rotatable about a common central longitudinal axis, at least one of said members being formed with an annular bead adjacent and spaced inwardly from its peripheral portion and projecting away from the other member, providing a plurality of similar air moving blades formed with notches extending outwardly from the inner edges of the blades which notches have outwardly diverging lateral edges, longitudinally positioning said blades in an annular series with their notches forming an annular series and with the peripheral portions of the two supporting members extending into the notches, connecting said blades with each other at the ends thereof, longitudinally pressing the two supporting members at said annular bead and thus at least partly flattening said bead and resultantly causing the corresponding peripheral portion to swing away from the other peripheral portion so that the two peripheral portions outwardly diverge and have pressure engagement with the outwardly diverging edges of the blade notches so as to firmly hold the blades in fixed relationship to the supporting member, and continuing said longitudinal pressing at said annular bead to resultantly cause said annular portion at positions between the blades to additionally swing away from the other peripheral portion so that said peripheral portion has an undulating shape to maintain the blades in equally spaced relationship.

4. The herein disclosed method for making a centrifugal blower wheel, which method comprises providing two sheet metal supporting discs connected with each other and having adjacent continuous peripheral portions with approximately equal diameters which discs are rotatable about a common central longitudinal axis, each of said discs being formed with an annular bead adjacent and spaced inwardly from its peripheral portion and projecting away from the other disc, providing a plurality of similar air moving blades formed with notches extending outwardly from the inner edges of the blades which notches have outwardly diverging lateral edges, longitudinally positioning the said blades in an annular series with their notches forming an annular series and with the peripheral portions of the two supporting discs extending into the notches, connecting said blades with each other at the ends thereof, longitudinally pressing the two supporting discs at said annular beads and thus at least partly flattening said beads and resultantly causing the corresponding peripheral portions of the discs to swing away from each other and outwardly diverge so that the two peripheral portions have pressure engagement with the outwardly diverging edges of the blade notches so as to firmly hold the blades in fixed relationship to the disc, and continuing said longitudinal pressing at said beads to resultantly cause said peripheral portions at positions between the blades to have a divergence greater than the divergence at the blades so that said portions serve to maintain the blades in equally spaced relationship.

5. The herein disclosed method for making a centrifugal blower wheel, which method comprises providing two sheet metal supporting discs connected with each other and having adjacent continuous peripheral portions with approximately equal diameters which discs are rotatable about a common central longitudinal axis, each of said discs being formed with an annular bead adjacent and spaced inwardly from its peripheral portion and projecting away from the other disc, providing a plurality of similar air moving blades formed with notches extending outwardly from the inner edges of the blades which notches have outwardly diverging lateral edges, longitudinally positioning said blades in an annular series with their notches forming an annular series and with the peripheral portions of the two supporting discs extending into the notches, connecting said blades with each other at the ends thereof, and longitudinally pressing the two supporting discs at said annular beads so as to completely flatten said beads and resultantly cause the corresponding peripheral portions of the discs to swing away from each other and outwardly diverge so that the two peripheral portions have pressure engagement with the outwardly diverging edges of the blade notches so as to firmly hold the blades in fixed relationship to the disc.

6. The herein disclosed method for making a centrifugal blower wheel, which method comprises providing two sheet metal supporting members connected with each other and having adjacent continuous peripheral portions with approximately equal diameters which members are rotatable about a common central longitudinal axis, at least one of said members being formed with an annular bead adjacent and spaced inwardly from its peripheral portion and projecting away from the other member which bead in radial section has an inclined substantially straight outer side and an inclined substantially straight inner side, providing a plurality of similar air moving blades formed with notches extending outwardly from the inner edges of the blades which notches have outwardly diverging lateral edges, longitudinally positioning said blades in an annular series with their notches forming an annular series and with the peripheral portions of the two supporting members extending into the notches, connecting said blades with each other at the ends thereof, and longitudinally pressing the two supporting members at said annular bead and thus completely flattening said bead and resultantly causing the corresponding peripheral portion to swing away from the other peripheral portion so that the two peripheral portions outwardly diverge and have pressure engagement with the outwardly diverging edges of the blade notches so as to firmly hold the blades in fixed relationship to the supporting member.

7. The method as set forth in claim 6, wherein the outer straight side of the bead has an angle to a radial line substantially greater than the angle to said radial line of the inner straight side of said bead.

8. The herein disclosed method for making a centrifugal blower wheel, which method comprises providing two sheet metal supporting discs connected with each other and having adjacent continuous peripheral portions with approximately equal diameters which discs are rotatable about a common central longitudinal axis, each of said discs being formed with an annular bead adjacent and spaced inwardly from its peripheral portion and projecting away from the other disc which bead in radial section has an inclined substantially straight outer side and an inclined substantially straight inner side, providing a plurality of similar air moving blades formed with notches extending outwardly from the inner edges of the blades which notches have outwardly diverging lateral edges, longitudinally positioning said blades in an annular series with their notches forming an annular series and with the peripheral portions of the two supporting discs extending into the notches, connecting said blades with each other at the ends thereof, and longitudinally pressing the two supporting discs at said annular beads and thus completely flattening said beads and resultantly causing the corresponding peripheral portions of the discs to swing away from each other and outwardly diverge so that the two peripheral portions have pressure engagement with the outwardly diverging edges of the blade notches so as to firmly hold the blades in fixed relationship to the disc.

9. The herein disclosed method for making a centrifugal blower wheel, which method comprises providing two sheet metal supporting discs connected with each other and having adjacent continuous peripheral portions with approximately equal diameters which discs are rotatable about a common central longitudinal axis, each of said discs being formed with an annular bead adjacent and spaced inwardly from its peripheral portion and projecting away from the other disc, providing a plurality of similar air moving blades formed with notches extending outwardly from the inner edges of the blades which notches have opposite lateral edges, longitudinally positioning said blades in an annular series with their notches forming an annular series and with the peripheral portions of the two supporting discs extending into the notches, connecting said blades with each other at the ends thereof, and longitudinally pressing the two supporting discs at said annular beads and thus at least partly flattening said beads and resultantly causing the corresponding peripheral portions of the discs to swing away from each other and outwardly diverge so that the two peripheral portions have pressure engagement with the opposite lateral edges of the blade notches so as to firmly hold the blades in fixed relationship to the discs.

10. The herein disclosed method for making a centrifugal blower wheel, which method comprises providing two sheet metal supporting discs connected with each other and having adjacent continuous peripheral portions with approximately equal diameters which discs are rotatable about a common central longitudinal axis, each of said discs being formed with an annular bead adjacent and spaced inwardly from its peripheral portion and projecting away from the other disc, providing a plurality of similar air moving blades formed with notches extending outwardly from the inner edges of the blades which notches have opposite lateral edges, longitudinally positioning the said blades in an annular series with their notches forming an annular series and with the peripheral portions of the two supporting discs extending into the notches, connecting said blades with each other at the ends thereof, longitudinally pressing the two supporting discs at said annular beads and thus at least partly flattening said beads and resultantly causing the corresponding peripheral portions of the discs to swing away from each other and outwardly diverge so that the two peripheral portions have pressure engagement with the opposite lateral edges of the blade notches so as to firmly hold the blades in fixed relationship to the disc, and continuing said longitudinal pressing at said beads to resultantly cause said peripheral portions at positions between the blades to have a divergence greater than the divergence at the blades so that said portions serve to maintain the blades in equally spaced relationship.

11. For use in making a centrifugal blower wheel including an annular series of similar air moving blades having inner and outer longitudinal edges which blades have their said inner edges at a predetermined radius from a central axis and are formed with notches extending outwardly from the inner blade edges and having opposite lateral edges, an initial central blade support structure comprising in combination a hub means rotatable about a central longitudinal axis and adapted for mounting on a rotatable shaft, a generally radial first circular disc connected with the hub means and provided with an inner annular flat portion and also provided with an annular bead surrounding said inner flat portion with the radius of said bead at its edge slightly less than said radius of the inner edges of the blades which first disc is further provided with an outer annular flat portion surrounding said bead and located in the same plane as the inner annular portion and extending from said bead to an exposed peripheral edge, and a generally radial second circular disc located at the side of the first disc opposite the bead which second disc has inner and outer annular portions respectively in face-to-face engagement with said inner and outer annular portions of the first disc and has an exposed peripheral edge with approximately the same diameter as that of the first disc, said outer annular portions of the two discs having a radial width that is less than one-half the width of the blades between their inner and outer edges and said portions being adapted for entry in the notches in the blades of an annular series such as aforesaid with said bead located closely adjacent the inner edges of the blades and said peripheral portions of said discs and said bead on said first disc being so related to each other that pressure applied longitudinally to said bead sufficient to at least partially flatten it would cause one of said peripheral portions to swing away from the other so that said two peripheral portions would outwardly diverge and would engage the opposite lateral edges of the blade notches.

12. An initial central blade support structure as set forth in claim 11, wherein at least one of said discs has an annular series of peripheral notches in its outer annular portion spaced to receive portions of the blades.

13. An initial central support structure as set forth in claim 11, wherein said bead in radial section has an inclined substantially straight outer side and an inclined substantially straight inner side.

14. An initial central support structure as set forth in claim 11, wherein said bead in radial section has an inclined substantially straight outer side and an inclined substantially straight inner side with the outer side having the greater angle of inclination.

15. For use in making a centrifugal blower wheel including an annular series of similar air moving blades having inner and outer longitudinal edges which blades have their said inner edges at a predetermined radius from a central axis and are formed with notches extending outwardly from the inner blade edges and having opposite lateral edges, an initial central blade support structure comprising in combination a hub means rotatable about a central longitudinal axis and adapted for mounting on a rotatable shaft, and two generally radial circular discs connected with the hub means and provided respectively with inner annular flat portions in face-to-face engagement with each other and also provided respectively with oppositely projecting annular beads surrounding said inner flat portions with the radius of said beads at the outer edges thereof slightly less than said radius of the inner edges of the blades which discs are further provided respectively with outer annular flat portions surrounding said beads and located in the same planes as the inner annular portions and in face-to-face engagement with each other and which said outer annular portions extend from said beads to exposed peripheral edges having the same diameter, said outer annular portions of the two discs having a radial width that is less than one-half the width of the blades between their inner and outer edges and said portions being adapted for entry in the notches in the blades of an annular series such as aforesaid with said beads located closely adjacent the inner edges of the blades and said peripheral portions of said discs and said beads being so related to each other that pressure applied longitudinally to said beads sufficient to at least partially flatten them would cause said peripheral portions to swing away from each other so that said two peripheral portions would outwardly diverge and would engage the opposite lateral edges of the blade notches.

16. An initial central support structure as set forth in claim 15, wherein each of said beads in radial section has an inclined substantially straight outer side and an inclined substantially straight inner side with the outer side having the greater angle of inclination.

17. The hereindisclosed method for making a centrifugal blower wheel, which method comprises providing two sheet metal supporting discs connected with each other and having adjacent continuous peripheral portions with approximately equal diameters which discs are rotatable about a common central longitudinal axis, providing a plurality of similar air moving blades formed with notches extending outwardly from the inner edges of the blades which notches have outwardly diverging edges, longitudinally positioning said blades in an annular series with their notches forming an annular series and with the peripheral portions of the two supporting discs extending into the notches, connecting said blades with each other at the ends thereof, and applying pressure to said two supporting discs to cause the peripheral portions thereof to swing away from each other and outwardly diverge so that the two peripheral portions have pressure engagement with the outwardly diverging edges of the blade notches so as to firmly hold the blades in fixed relationship to the discs.

References Cited in the file of this patent

UNITED STATES PATENTS

| | | |
|---|---|---|
| 456,699 | Green | July 28, 1891 |
| 504,208 | Fox | Aug. 29, 1893 |
| 519,805 | Bavier | May 15, 1894 |
| 787,907 | Farwell | Apr. 25, 1905 |
| 879,382 | Harris | Feb. 18, 1908 |
| 900,739 | Jude et al. | Oct. 13, 1908 |
| 903,532 | Anderson | Nov. 10, 1908 |

(Other references on following page)

UNITED STATES PATENTS

| | | |
|---|---|---|
| 978,036 | Klahn | Dec. 6, 1910 |
| 1,393,121 | Heiby et al. | Oct. 11, 1921 |
| 1,748,452 | Martins | Feb. 25, 1930 |
| 1,876,518 | Mathis | Sept. 6, 1932 |
| 2,125,697 | Swingle et al. | Aug. 2, 1938 |
| 2,157,441 | Sullivan | May 9, 1939 |
| 2,188,953 | Mitchell | Feb. 6, 1940 |
| 2,240,238 | Baker | Apr. 29, 1941 |
| 2,304,581 | Lyon | Dec. 8, 1942 |
| 2,315,407 | Evans | Mar. 30, 1943 |
| 2,537,805 | Wilken | Jan. 9, 1951 |
| 2,711,285 | Burrowes | June 21, 1955 |

FOREIGN PATENTS

| | | |
|---|---|---|
| 801,202 | France | May 16, 1936 |
| 670,392 | Great Britain | Apr. 6, 1952 |